United States Patent Office 3,641,218
Patented Feb. 8, 1972

3,641,218
HYDROGENATED BIS PHENOL DIPHOSPHITES
Lester Friedman, Beachwood, Ohio, Kenneth H. Rattenbury, Morgantown, W. Va., and Alvin Guttag, Bethesda, Md., assignors to Weston Chemical Corporation, New York, N.Y.
No Drawing. Filed Aug. 29, 1968, Ser. No. 756,289
Int. Cl. C07f 9/08; C08f 45/581
U.S. Cl. 260—928          12 Claims

ABSTRACT OF THE DISCLOSURE

Compounds are prepared having the formula

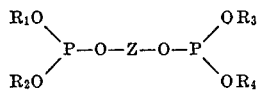

where $R_1$, $R_2$, $R_3$ and $R_4$ are selected from the group consisting of alkyl, aryl, alkenyl, haloalkyl haloaryl or the monovalent residue of a hydrogenated dihydric phenol, Z is the divalent residue of a dihydric alcohol or a hydrogenated dihydric phenol, at least one of $R_1$, $R_2$, $R_?$ and $R_4$ is a residue of a hydrogenated dihydric phenol. Preferably at least 3 of $R_1$, $R_2$, $R_3$ and $R_4$ are such a hydrogenated dihydric phenol residue.

The compounds are useful as stabilizers for halogen containing polymers, hydrocarbon polymers, hydrocarbon oils, polyurethanes and polyesters.

---

The present invention relates to novel phosphites.

It is an object of the present invention to prepare novel phosphites.

Another object is to develop novel stabilizers for hydrocarbon polymers, halogen containing polymers, natural and synthetic rubbers and other polymers.

A more specific object is to prepare stabilizers for rigid polyvinyl chloride resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention, will become apparent to those skilled in the art from this detailed description.

It has now been found that these objects can be attained by preparing phosphites having the formula

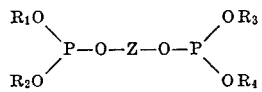

where $R_1$, $R_2$, $R_3$ and $R_4$ are selected from the group consisting of alkyl, aryl, alkenyl, haloalkyl, haloaryl or the monovalent residue of a hydrogenated dihydric phenol, Z is the residue of a dihydric alcohol or a hydrogenated dihydric phenol and at least one of $R_1$, $R_2$, $R_3$ and $R_4$ is a residue of a hydrogenated dihydric phenol. Preferably at least 3 of $R_1$, $R_2$, $R_3$ and $R_4$ are such a hydrogenated dihydric phenol residue. A particularly preferred compound has all of $R_1$, $R_2$, $R_3$, $R_4$ and Z as residues of a hydrogenated dihydric phenol.

When $R_1$, $R_2$, $R_3$ and $R_4$ are the residues of a hydrogenated dihydric phenol they can have the formula

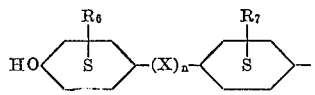

where $R_6$ and $R_7$ are hydrogen or alkyl, is O, S or $SO_2$ or

where $R_8$ and $R_9$ are hydrogen or lower alkyl and $n$ is 0 or 1.

Typical examples of Z are $-(CH_2)_n-$ where $n$ is an integer from 2 to 20 or more, $-(C_xH_{2x}O)_yC_xH_{2x}-$ where $x$ is an integer of 2 to 6 and $y$ is an integer of 1 to 100 or even more, $-C_xH_{2x}SC_xH_{2x}-$,

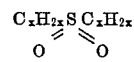

and the residue of a hydrogenated dihydric phenol having the formula

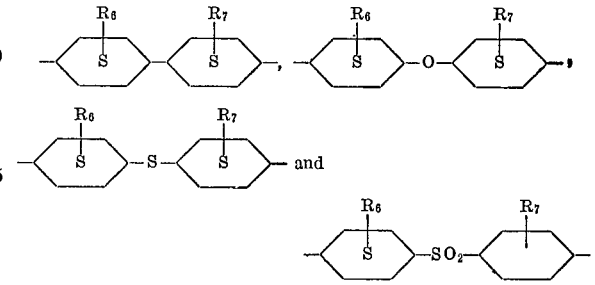

where $R_6$ and $R_7$ are hydrogen or alkyl.

The compounds are useful as high molecular weight stabilizers for halogen containing resins such as vinyl chloride resins, hydrocarbon polymers such as monoolefin polymers including polypropylene polyethylene ethylene-propylene copolymers and terpolymers, natural rubber, synthetic rubbers, e.g. cis isoprene polymer, butadiene-styrene copolymer (SBR rubber) and rubbery and resinous acrylonitrile-butadiene-styrene copolymers. They are also useful for stabilizing hydrocarbon oils and foodstuffs. The compounds having free hydroxyl groups can be used as a reactant in making polyurethanes and polyesters. They also impart heat and light stability to such polymers.

The compounds having hydrogenated dihydric phenol residues and particularly those having residue of hydrogenated Bisphenol A are excellent stabilizers for rigid polyvinyl chloride resins.

As used in the present specification and claims the symbol

represents the carbocyclic benzene ring and the symbol

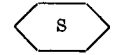

indicates that the ring is completely saturated.

The compounds of the present invention can be prepared by reaction of a compound having the formula

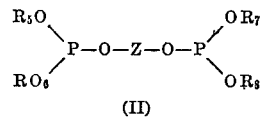

(II)

where $R_5$, $R_6$, $R_7$ and $R_8$ are alkyl, aryl, alkenyl or haloaryl with from 1 to 4 moles of a hydrogenated dihydric phenol and removing 1 to 4 moles of $R_5OH$, $R_6OH$, $R_7OH$ and $R_8OH$. When $R_1$, $R_2$, $R_3$, $R_4$ and $R_5$ are all residues of a hydrogenated dihydric phenol the compounds can also be formed by reacting 5 moles of the hydrogenated dihydric phenol with 2 moles of a phosphite having the formula

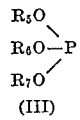

(III)

and removing 6 moles of $R_5OH$, $R_6OH$ and $R_7OH$. The $R_5OH$, $R_6OH$, $R_7OH$ and $R_8OH$ phenol or alcohol which is to be removed should be lower boiling than the hydrogenated dihydric phenol and preferably does not boil substantially above 200° C.

As compounds having the Formula III there can be used trimethyl phosphite, triethyl phosphite, triisopropyl phosphite, tributyl phosphite, trihexyl phosphite, tricyclohexyl phosphite, tris decyl phosphite, tris isodecyl phosphite, diphenyl decyl phosphite, triallyl phosphite, tris dodecyl phosphite, tristearyl phosphite, trioleyl phosphite, methyl distearyl phosphite, methyl dioleyl phosphite, methyl dilauryl phosphite, methyl dihexadecyl phosphite, diethyl stearyl phosphite, triphenyl phosphite, tri p-cresyl phosphite, tri o-cresyl phosphite, tri-(4-dodecyl phenyl) phosphite, tri (t-amylphenyl) phosphite, tris (alpha naphthyl) phosphite, tri (2-chlorophenyl) phosphite, tri 4-(bromophenyl phosphite), tri (2,4-dichlorophenyl) phosphite, tris (2-chloroethyl) phosphite, tris (2-chloroisopropyl) phosphite, tris (2-bromoethyl) phosphite, tris (o-cyclohexylphenyl) phosphite, tris (2-fluorophenyl) phosphite, tris (4-t-butylphenyl) phosphite, tris octyl phosphite, tris isooctyl phosphite, diphenyl 4-methylphenyl phosphite.

As used in the present specification and claims the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis (4-hydroxycyclohexyl) dimethylmethane or hydrogenated bisphenol A), di (4-hydroxycyclohexyl) methyl ethyl methane,
di (4-hydroxycyclohexyl) methane,
di (4-hydroxycyclohexyl)
bis (2-hydroxycyclohexyl) dimethyl methane,
1,4-dihydroxycyclohexane,
di (4-hydroxy-3-methylcyclohexyl) dimethyl methane,
di (4-hydroxy-3-methylcyclohexyl) methyl methane,
di (4-hydroxy-3-methylcyclohexyl) cyclohexyl methane,
di (4-hydroxycyclohexyl) sulfone,
di (4-hydroxycyclohexyl) sulfide,
di (3-hydroxycyclohexyl) dimethyl methane,
4,4'-methylene bis (2-methyl-6-t-butylcyclohexanol),
di (4-hydroxycyclohexyl) ether,
1,3-dihydroxycyclohexane,
di (3-chloro-4-hydroxycyclohexyl) dimethyl methane.

The preferred starting hydrogenated dihydric phenols are hydrogenated bisphenols, the most preferred being hydrogenated bisphenol A.

The starting compounds of Formula II are also old compounds. Methods of preparing such compounds are shown for example in Friedman Pat. 3,047,608 col. 7 lines 57–73 and Examples 31 and 32 and Larrison Pat. 3,356,770 col. 9 line 6 to col. 11 line 42. Typical examples of such starting compounds are tetraphenyl ethylene diphosphite, tetraphenyl hexamethylene diphosphite, tetraphenyl propylene diphosphite, tetraphenyl trimethylene diphosphite, tetraphenyl tetramethylene diphosphite, tetra (isodecyl) ethylene diphosphite, tetra (p-chlorophenyl) hexamethylene diphosphite, tetraphenyl diethylene glycol diphosphite, tetraphenyl triethylene glycol diphosphite, tetraphenyl polyethylene glycol molecular weight 1000 diphosphite, tetraphenyl polyethylene glycol molecular weight 4000 diphosphite, tetraphenyl dipropylene glycol disphosphite, tetraphenyl tripropylene glycol diphosphite, tetraphenyl polypropylene glycol molecular weight 425 diphosphite, tetraphenyl polypropylene glycol molecular weight 2025 diphosphite, tetraphenyl thiodiethylene glycol diphosphite

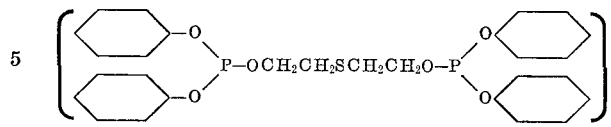

tetraphenyl thiodipropylene glycol diphosphite, tetraphenyl sulfonyldipropylene glycol diphosphite, tetraphenyl sulfonyl diethylene glycol diphosphite

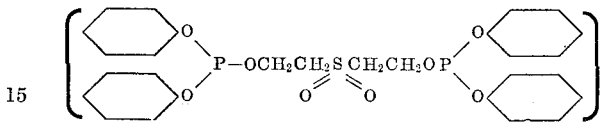

diphenyl di p-nonylphenyl diethylene glycol diphosphite, diphenyl distearyl dipropylene glycol diphosphite, diphenyl dioleyl diethylene glycol diphosphite, tetra octyl diethylene glycol diphosphite, tetra (decyl) dipropylene glycol diphosphite, tetra (p-chlorophenyl) diethylene glycol diphosphite, tetra (2-chloroethyl) dipropylene glycol diphosphite, tetra (2-chloropropyl) diethylene glycol diphosphite, tetraallyl tripropylene glycol diphosphite, phenyl tri (o-bromophenyl) triethylene glycol diphosphite, tetra (p-fluorophenyl) diethylene glycol diphosphite, tetra (p-nonylphenyl) hydrogenated bisphenol A diphosphite, phenyl tri (eicosanyl) hydrogenated bisphenol A diphosphite, tetramethyl dipropylene glycol diphosphite, tetraphenyl hydrogenated bisphenol A diphosphite, diphenyl di (p-t-octylphenyl) hydrogenated bisphenol A diphosphite, diphenyl di (octyl) hydrogenated bisphenol A diphosphite, tetra (decyl) hydrogenated bisphenol A diphosphite, tetraphenyl bis (cyclohexylene) methyl methane diphosphite, triphenyl p-nonylphenyl bis (cyclohexylene) methane diphosphite, tetra (octyl) bis (cyclohexylene) methyl ethyl methane diphosphite, diphenyl di (octadecyl) bis (cyclohexylene) diphosphite, dimethyl dioleyl 1,4-cyclohexylene diphosphite, dimethyl distearyl bis (3-methylcyclohexylene) methyl methane diphosphite, tetraphenyl bis (cyclohexylene) sulfide diphosphite, tetra (p-methylphenyl) bis (cyclohexylene) sulfone diphosphite, tetraphenyl bis (cyclohexylene) ether diphosphite, tetra (isodecyl) bis (3-chlorocyclohexylene) dimethyl methane diphosphite.

While the above phosphite forming reactions can be carried out at atmospheric pressure or super atmospheric pressure they are preferably carried out in a vacuum, e.g. 0.1 to 100 mm. pressure, usually at 5–15 mm. pressure, at the boiling point of the monohydric alcohol or monohydric phenol which is being removed.

Unless otherwise indicated all parts and percentages are by weight.

The reactions set forth above are all preferably catalyzed with 0.1 to 5% based on the weight of the phosphite reactant or reactants of a catalyst which usually is a phosphite, e.g. a dialkyl phosphite, a diaryl phosphite or a dihaloaryl phosphite or an alkaline catalyst. Examples of suitable catalysts are diphenyl phosphite, di (2-methylphenyl) phosphite, di (4-dodecylphenyl) phosphite, di (4-octadecylphenyl) phosphite, di (2-chlorophenyl) phosphite, di (2,4-dimethylphenyl) phosphite, di (4-bromophenyl) phosphite, diethyl phosphite, dicyclohexyl phosphite, phenyl 3-methylphenyl phosphite, dioctadecyl phosphite, dimethyl phosphite, sodium phenolate, sodium dicylate, potassium p-cresylate, sodium ethylate, sodium octdeconolate, sodium hydride, sodium metal, potassium metal, lithium methylate, sodium cetylate, trimethyl benzyl ammonium hydroxide and other quaternary ammonium hydroxides, sodium hydroxide, potassium hydroxide, calcium ethylate, sodium methylate, guanidines, e.g. pentamethyl guanidine.

Examples of compounds of the present invention within Formula I are tetra (hydrogenated bisphenol A) hydrogenated bisphenol A diphosphite, tetra ((4-hydroxycyclohexylisobutylidene cyclohexyl) bis (cyclohexylene) methyl ethyl methane disphosphite, tetra (4-hydroxycyclohexylethylidene cyclohexyl bis (cyclohexylene methyl methane diphosphite, tetra (4-hydroxycyclohexylmethylene cyclohexyl) bis (cyclohexylene) methane disphosphite, hydrogenated bisphenol A triphenyl hydrogenated bisphenol A diphosphite (having the formula tetra (4-hydroxycyclohexyl ethylidene cyclohexyl) dipropylene glycol diphosphite, tetra (4-hydroxycyclohexylthiocyclohexyl) diethylene glycol diphosphite, tri (4-hydroxycyclohexylmethylenecyclohexyl) p-nonylphenyl tripropylene glycol diphosphite.

The compounds of the present invention are generally solids although when a higher polyalkylene bridge is

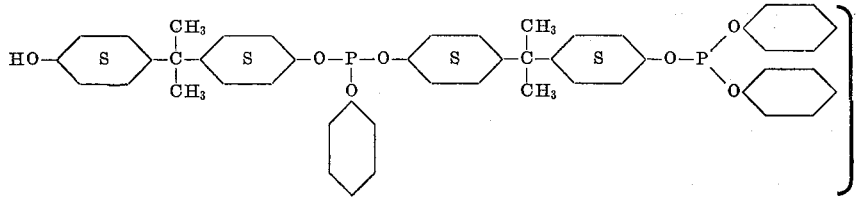

bis (hydrogenated bisphenol A) diphenyl hydrogenated bisphenol A diphosphite, tris (hydrogenated bisphenol A) phenyl hydrogenated bisphenol A diphosphite, tris (hydrogenated bisphenol A) stearyl hydrogenated bisphenol A diphosphite, bis (hydrogenated bisphenol A) dioleyl hydrogenated bisphenol A diphosphite, tris (hydrogenated bisphenol A) p-nonylphenyl hydrogenated bisphenol A diphosphite, tris (hydrogenated bisphenol A) p-chlorophenyl hydrogenated bisphenol A diphosphite, tris (hydrogenated bisphenol A) o-bromophenyl hydrogenated bisphenol A diphosphite, tris (hydrogenated bisphenol A) m-fluorophenyl hydrogenated bisphenol A diphosphite, tris (hydrogenated bisphenol A) 2-chloropropyl hydrogenated bisphenol A diphosphite, tetra (hydrogenated bisphenol A) diethylene glycol diphosphite, tetra (hydrogenated bisphenol A) dipropylene glycol diphosphite, tetra (hydrogenated bisphenol A) polypropylene glycol 425 diphosphite, tetra (hydrogenated bisphenol A) polyethylene glycol 1000 diphosphite, tetra (hydrogenated bisphenol A) hexamethylene glycol diphosphite, tetra (hydrogenated bisphenol A) ethylene glycol diphosphite, tetra (hydrogenated bisphenol A) thiodiethylene glycol diphosphite, tetra (hydrogenated bisphenol A) sulfonyl dipropylene glycol diphosphite, tris (hydrogenated bisphenol A) phenyl diethylene glycol diphosphite, tris (hydrogenated bispenol A) decyl dipropylene glycol diphosphite, tris (hydrogenated bisphenol) p - nonylphenyl dipropylene glycol diphosphite, tris hydrogenated bisphenol A) stearyl triethylene glycol diphosphite, tris (hydrogenated bisphenol A) oleyl tripropylene glycol diphosphite, tris (hydrogenated bisphenol A) methyl tetraethylene glycol diphosphite, tris (hydrogenated bisphenol A) eicosanyl dipropylene glycol diphosphite, tris (hydrogenated bisphenol A) 2,4,6-trichlorophenyl diethylene glycol diphosphite, tris (hydrogenated bisphenol A) 2-chloroethyl dipropylene glycol diphosphite, bis (hydrogenated bisphenol A) diphenyl diethylene glycol diphosphite, bis (hydrogenated bisphenol A) di (p-octadecylphenyl) dipropylene glycol diphosphite, bis (hydrogenated bisphenol A) distearyl diethylene glycol diphosphite, bis (hydrogenated bisphenol A) di (isodecyl) dipropylene glycol diphosphite, hydrogenated bisphenol A triphenyl diethylene glycol diphosphite, hydrogenated bisphenol A tris (p-nonylphenyl) dipropylene glycol diphosphite, tetra (4-hydroxycyclohexyl sec-butylidene cyclohexyl) diethylene glycol diphosphite—having the formula

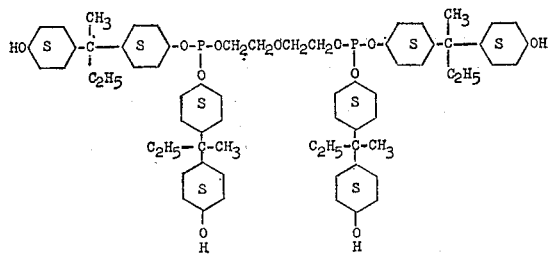

present the compounds are viscous liquids unless there are three or more hydrogenated dihydric phenol units in the molecule.

The compounds are useful as heat and light stabilizers and antioxidants.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g. 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85:15), copolymers of vinyl chloride with 1 to 90%, preferably 1 to 40%, by weight of copolymerizable materials such as vinyl acetate, vinylidene chloride, vinylidene diethyl fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloro - ethylene (95:5), vinyl chloride - acrylonitrile (60:40), vinyl chloride-2-ethylhexyl acrylate (80:20). They can also be used to stabilize resins where the halogen containing component is present in minor amount, e.g. acrylonitrile-vinyl chloride copolymer (85:15) or halogenated rubbers e.g. polychloroprene, chlorinated polyisobutylene, chlorinated natural rubber, chlorine containing polyurethanes, etc.

As is conventional in the art when the novel phosphites are employed with halogen containing resins there can be added barium, cadmium and zinc salts and synergistic activity is noted in this connection. Thus there can be included 0.5 to 10% of salts such as mixed barium-cadminium laurates, barium laurate, cadmium laurate, zinc stearate, cadmium 2-ethylhexoate, barium nonylphenyl-barium octylphenolate, barium stearate, zinc octoate.

There can also be incorporated in the vinyl chloride resins and the like 0.5 to 10% of organotin compounds, particularly sulfur containing compounds such as dibutyltin bis (octylthioglycollate).

Conventional phenolic antioxidants can also be incorporated in an amount of 0.1 to 10%, e.g. 2,2-methylene bis (4-methyl-6-t-butylphenol), 2,4,6-tri-t-butylphenol, 4,4'-isopropylidenephenol, etc.

The novel phosphites of the present invention can also be incorporated in an amount of 0.01 to 20% as stabilizers for hydrocarbon polymers including monoolefin polymers such as polyethylene, polypropylene, ethylene-propylene copolymers, (e.g. 80:20, 50:50, 20:80), ethylene-propylene terpolymers, e.g. ethylene-propylene cyclooctadiene terpolymer, ethylene-butene-1 copolymer, ethylene-decene-1 copolymer, polystyrene, polyolefin, e.g. diolefin polymers such as natural rubber, rubbery butadiene styrene copolymer (75:25, 60:40) cis isoprene polymer, polybutadiene, polyisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes, (e.g. from toluene diisocyanate and polypropylene glycol molecular weight 2025), polyesters, e.g. Dacron (polyethylene terephthalate), polymeric tetramethylene terephthalate isophalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mostert Pat. 3,377,324, polycarbonate, e.g. the reaction product of bisphenol A with phosgene or diphenyl carbonate as well as other polycarbonates set forth in Fritz Pat. 3,305,520.

When incorporated in hydrocarbon polymers it is frequently advantageous to add conventional phenolic antioxidants as set forth above and conventional additives such as dilauryl thiodipropionate.

They are also useful as stabilizers for foods, oils, lubricants, and other products which deteriorate on oxidation.

The compounds of the invention are also useful as flame and fireproofing additives in polyurethane, hydrocarbon polymers, cellulose esters and ethers, e.g. cellulose acetate, methyl cellulose, ethyl cellulose, cellulose acetatepropionate, etc.

The field of great utility at the moment, however, appears to be as stabilizers for rigid vinyl chloride resins. Since the compounds of the present invention are monomeric with readily defined structures it is surprising that they will act as stabilizers for rigid vinyl chloride resins since the only phosphites previously found to satisfactorily stabilize rigid polyvinyl chloride are polymeric phosphites. The rigid polyvinyl chloride resins normally do not contain over 10% plasticizer and can be completely devoid of plasticizer.

Unless otherwise indicated all parts and percentages are by weight. The term moles as used in the specification is in gram molecular weights.

EXAMPLE 1

5 moles of hydrogenated bisphenol A, 2 moles of triphenyl phosphite and 10 grams of diphenyl phosphite were subjected to vacuum distillation at 10 mm. until 6 moles of phenol were removed. The product remaining in the pot was tetra (hydrogenated bisphenol A) hydrogenated bisphenol A diphosphite, a solid.

EXAMPLE 2

5 moles of di (4-hydroxycyclohexyl) methyl ethyl methane, 2 moles of tris isodecyl phosphite and 9 grams of diisodecyl phosphite were subjected to vacuum distillation at 10 mm. until 6 moles of isodecyl alcohol were removed. The solid product remaining in the pot after cooling was tetra (4-hydroxycyclohexyl sec-butylidene cyclohexyl) bis (cyclohexylene) methyl ethyl methane diphosphite.

EXAMPLE 3

5 moles of di (4-hydroxycyclohexyl) methane, 2 moles of triphenyl phosphite and 10 grams of diphenyl phosphite were subjected to vacuum distillation at 10 mm. until 6 moles of phenol were removed. The solid product remaining in the pot after cooling was tetra (4-hydroxycyclohexyl methylene cyclohexyl) bis (cyclohexyl) methane diphosphite.

EXAMPLE 4

1 mole of hydrogenated bisphenol A and 1 mole of tetraphenyl diethylene glycol diphosphite were heated in the presence of 10 grams of diphenyl phosphite and subjected to vacuum distillation at 10 mm. until 1 mole of phenol was removed. The solid product in the pot after cooling was hydrogenated bisphenol A triphenyl diethylene glycol diphosphite.

EXAMPLE 5

2 moles of hydrogenated bisphenol A, 1 mole of tetraphenyl dipropylene glycol diphosphite and 10 grams of diphenyl phosphite were subjected to vacuum distillation at 10 mm. until 2 moles of phenol were removed. The solid product remaining in the pot after cooling was bis (hydrogenated bisphenol A) diphenyl dipropylene glycol diphosphite.

EXAMPLE 6

3 moles of hydrogenated bisphenol A, 1 mole of tetra (isodecyl) diethylene glycol diphosphite and 10 grams of diisodecyl phosphite were subjected to vacuum distillation at 10 mm. until 3 moles of isodecyl alcohol were removed.

EXAMPLE 7

4 moles of hydrogenated bisphenol A, 1 mole of tetraphenyl diethylene glycol diphosphite and 10 grams of diphenyl phosphite were subjected to vacuum distillation at 10 mm. until 4 moles of phenol were removed. The solid product remaining in the pot after cooling was tetra (hydrogenated bisphenol A) diethylene glycol diphosphite.

EXAMPLE 8

4 moles of hydrogenated bisphenol A, 1 mole of tetraphenyl ethylene glycol diphosphite and 10 grams of diphenyl phosphite were subjected to vacuum distillation at 10 mm. until 4 moles of phenol were removed. The solid product remaining in the pot after cooling was tetra (hydrogenated bisphenol A) ethylene glycol diphosphite.

EXAMPLE 9

3 moles of hydrogenated bisphenol A, 1 mole of triphenyl p-nonylphenyl dipropylene glycol diphosphite and 10 grams of diphenyl phosphite were subjected to vacuum distillation at 10 mm. until 3 moles of phenol were removed. The solid product remaining in the pot after cooling was tris (hydrogenated bisphenol A) p-nonylphenyl dipropylene glycol diphosphite.

EXAMPLE 10

2 moles of hydrogenated bisphenol A, 2 moles of dimethyl distearyl diethylene glycol diphosphite and 8 grams of dimethyl phosphite were subjected to vacuum distillation until 2 moles of methyl alcohol were removed. The solid product remaining in the pot after cooling was bis (hydrogenated bisphenol A) distearyl diethylene glycol diphosphite.

EXAMPLE 11

| | Parts |
|---|---|
| Type 1 rigid polyvinyl chloride (QYSJ) | 100 |
| Calcium-zinc stearate (1:1 mixture) | 2 |
| Epoxidized soyabean | 3 |
| Stearic acid (processing acid) | 0.5 |
| Phosphite of Example 1 | 0.8 |

This mixture was extruded in the form of a parison and a bottle blow molded therefrom. The bottle was water white and perfectly clear and showed good heat and light stability.

Similar results were obtained when (a) the phosphite prepared in Example 6, (b) the phosphite prepared in Example 7, (c) the phosphite prepared in Example 9 and (d) the phosphite prepared in Example 10 were substituted for the phosphite prepared in Example 1 in the procedure of Example 11.

EXAMPLE 12

2 parts of the phosphite prepared in Example 1, 1 part of dioleyl thiodipropionate and 1 part of 2,2-methylene bis (4-methyl-6-t-butylphenol) were mixed with 100 parts of polypropylene (melt index 0.8) to give a stabilized product.

EXAMPLE 13

2 parts of the phosphite prepared in Example 1 and 1 part of 4,4'-isopropylidene diphenol were milled into 100 parts of SBR rubber (60% butadiene-40% styrene) to give a product stabilized against oxidation.

What is claimed is:

1. A phosphite having the formula $$\begin{matrix} R_1O \\ R_2O \end{matrix} P-O-Z-O-P \begin{matrix} OR_3 \\ OR_4 \end{matrix}$$

where $R_1$, $R_2$, $R_3$ and $R_4$ are selected from the group consisting of 1 to 20 carbon atom alkyl, phenyl, alkyl phenyl having 1 to 18 carbon atoms in the alkyl group, naphthyl, alkenyl of 3 to 18 carbon atoms, haloalkyl of 2 to 3 carbon atoms where the halogen is chlorine or bromine, halophenyl where the halogen atom is chlorine, bromine or fluorine and the monovalent residue of a hydrogenated dihydric phenol having the formula

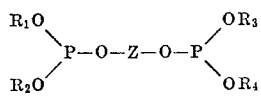

where $R_6$ and $R_7$ are hydrogen or 1 to 4 carbon alkyl X is O, S, SO$_2$ or

where $R_8$ and $R_9$ are hydrogen or lower alkyl and $n$ is zero or one, at least one of $R_1$, $R_2$, $R_3$ and $R_4$ is a residue of said hydrogenated dihydric phenol and Z is the divalent residue of a member of the group consisting of a dihydric alcohol and a hydrogenated dihydric phenol, said residue having a formula selected from the group consisting of
—(CH$_2$)$_m$—; —(C$_x$H$_{2x}$O)$_y$ C$_x$H$_{2x}$—; —C$_x$H$_{2x}$SC$_x$H$_{2x}$—;

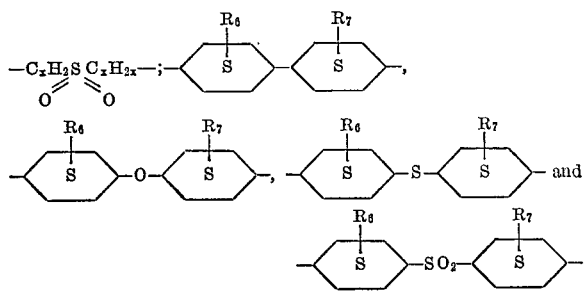

wherein $m$ is an integer of 2 to 20, $x$ is an integer of 2 to 6, and $y$ is any integer of 1 to 100.

2. A phosphite according to claim 1 wherein Z is the residue of a hydrogenated dihydric phenol.

3. A phosphite according to claim 2 wherein all of $R_1$, $R_2$, $R_3$ and $R_4$ are residues of hydrogenated dihydric phenols.

4. A phosphite according to claim 1 wherein Z is the divalent residue of a dihydric alcohol said residue having a formula selected from the group consisting of —(CH$_2$)$_n$—, —(C$_x$H$_{2x}$O)$_y$C$_x$H$_{2x}$—, —C$_x$H$_{2x}$SC$_x$H$_{2x}$— and

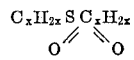

where $n$ is an integer of at least 2, $x$ is an integer of 2 to 6 and $y$ is an integer of 1 to 100.

5. A phosphite according to claim 4 wherein the residue of a hydrogenated dihydric phenol has the formula

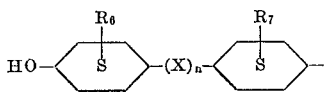

where $R_6$ and $R_7$ are hydrogen or 1 to 4 carbon alkyl, X is O, S, SO$_2$ or

where $R_8$ and $R_9$ are hydrogen or lower alkyl and $n$ is zero or one.

6. A phosphite according to claim 5 wherein the residue of the hydrogenated dihydric phenol has the formula

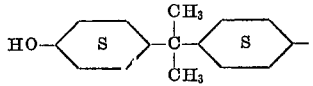

7. A phosphite according to claim 6 wherein at least 3 of $R_1$, $R_2$, $R_3$ and $R_4$ are the residue of the hydrogenated dihydric phenol.

8. A phosphite according to claim 7 wherein Z is a residue of a member of the group consisting of polyethylene glycol and polypropylene glycol.

9. A phosphite according to claim 6 wherein at least one of $R_1$, $R_2$, $R_3$ and $R_4$ is alkyl of 8 to 20 carbon atoms.

10. A phosphite according to claim 6 wherein at least one of $R_1$, $R_2$, $R_3$ and $R_4$ is phenyl or alkylphenyl having 1 to 18 carbon atoms in the alkyl group.

11. A phosphite according to claim 6 wherein at least one of $R_1$, $R_2$, $R_3$ and $R_4$ is alkenyl of 18 carbon atoms.

12. A phosphite according to claim 6 wherein Z has the formula —(CH$_2$)$_n$— and $n$ is an integer of 2 to 20.

References Cited

FOREIGN PATENTS 1,500,821  11/1967  France _____ 260—928

CHARLES B. PARKER, Primary Examiner

A. H. SUTTO, Assistant Examiner

U.S. Cl. X.R.

252—400; 260—45.95, 967, 982